April 8, 1924.                                           1,489,570
C. E. WHITE
BEET LIFTING BLADE
Original Filed May 5, 1919
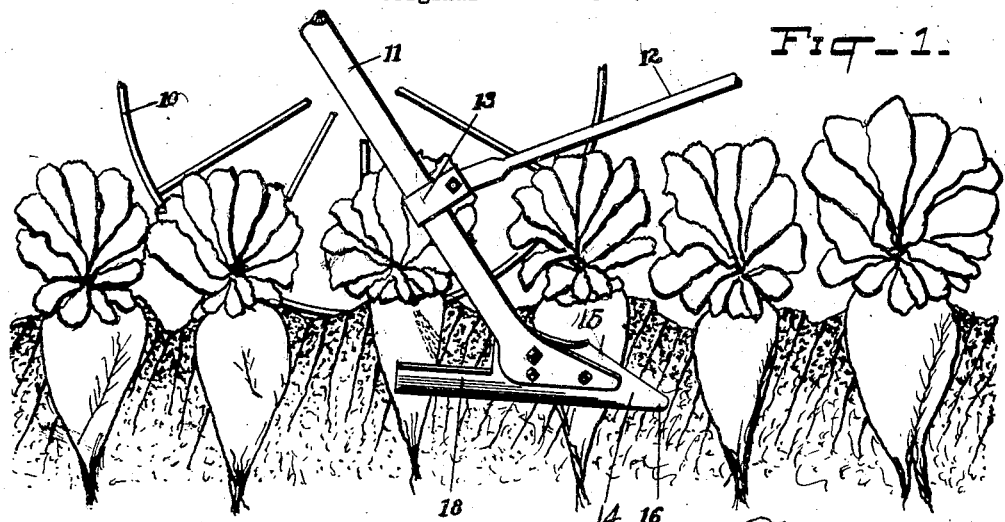
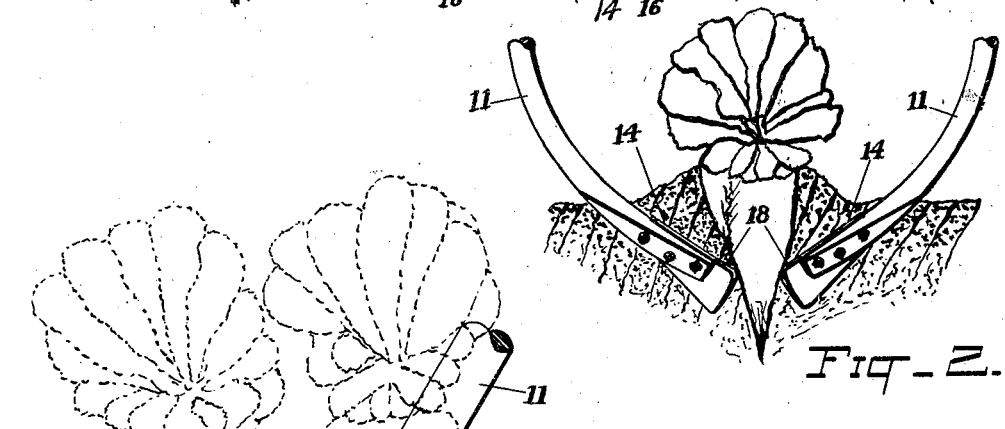
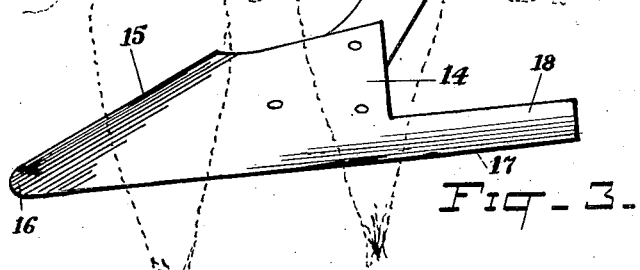
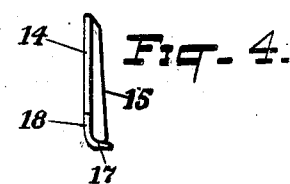
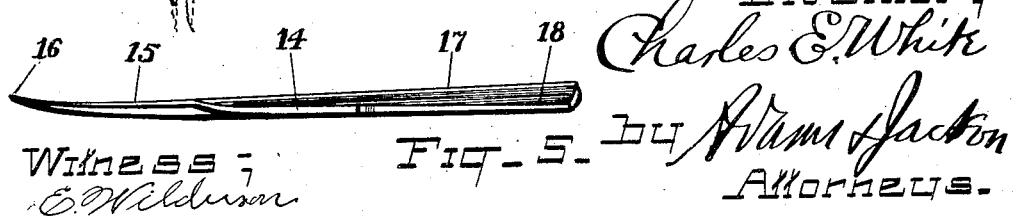

Patented Apr. 8, 1924.

1,489,570

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

BEET-LIFTING BLADE.

Original application filed May 5, 1919, Serial No. 294,634. Divided and this application filed February 16, 1920. Serial No. 359,126.

*To all whom it may concern:*

Be it known that I, CHARLES E. WHITE, a citizen of the United States, and a resident of Moline, in the county of Rock Island and State of Illinois, have invented certain new and useful Improvements in Beet-Lifting Blades, of which the following is a specification, reference being had to the accompanying drawings.

This application is filed as a division of my application, Serial No. 294,634, filed by me on May 5, 1919.

My invention relates to improvements in beet lifting blades and it has for its principal object the provision of a new and improved form of blade for use upon an implement generally known as a beet puller. My improved blade is designed for loosening thoroughly the earth around the beet and slightly raising the beet so that it can be easily removed by hand, but without forcing the beet entirely out of the ground. It is one of my objects also to give the blade such a form as to force the beet upward slightly as above described without breaking the skin. As a result of the use of my improved means operating upon a row of beets, the beets are protected against the shrinkage which would result from the drying out and shriveling by exposure to the sun and air which has always resulted when beets have been left lying on top of the ground for any considerable time after being operated upon by the well-known type of beet pullers in use heretofore. By the elimination of a great proportion of the pressure upon the beet which has heretofore forced the beet out of the ground and the consequent much reduced likelihood of bruising the beet, I seek to prevent the loss of any of the sweet, rich juices, the most valuable part of the beet, which would escape and evaporate if the beet were broken so as to bleed freely. I have accomplished my several objects by the means illustrated in the drawings and hereinafter described. That which I believe to be new and desire to cover by this application is set forth in the claims.

In the drawings,—

Fig. 1 is a view showing in side elevation a row of beets in the earth and showing the position of one of my improved lifting blades in relation to the beets;

Fig. 2 is a view at right angles to a row of beets showing in rear elevation two of my improved blades in operative position relative thereto;

Fig. 3 is an enlarged inner face view of one of my improved blades in operative position with respect to two beets of a row represented in dotted lines;

Fig. 4 is an end view of the blade shown in Fig. 3 but detached from the blade beam, and Fig. 5 is a view of the blade as seen looking toward its upper edge.

Referring to the several figures of the drawings,—10 indicates one of the wheels, partly broken away, upon which is mounted the framework of the beet puller machine of any approved type upon which the beams 11 are appropriately mounted. 12 indicates a draft bar forming a part of the framework by which the beam 11 is braced movably in position, the bar 12 being connected at its rear end to the beam 11 by means of a clip 13 of any approved type.

My improved blade which is secured by means of suitable bolts to the lower end of the beam 11 is in the form of a flat plate 14, the upper edge portion 15 of which is inclined quite sharply upwardly and rearwardly for a considerable portion of its length, such inclined upper edge portion approaching closely at its front end to the lower edge of the blade and thus forming a point 16 that readily penetrates the soil. The inclined marginal or edge portion 15 is turned outwardly to a slight extent away from the plane of the flat plate 14, as is best shown in Fig. 5. This outward turning of the edge or marginal portion 15 in the direction away from the row of beets upon which the blade is operating is not in the nature of a sharp bend but is rather a curving or rounding of the material of the blade whereby the blade is prevented from cutting or scarring the beets by contact with this edge even though one or more of the beets may happen to be out of alinement with the remaining beets of the row.

The lower edge of the blade is also turned outwardly, as indicated at 17, so as to present a smooth, continuous, rounding surface towards the beets as they are loosened. The lower portion of the main blade 14; including the said rounded lower marginal portion 17, is extended rearwardly in the form of a runner 18 beyond the body portion 14, as is best shown in Fig. 3. Such runner-like extension gives support to the beets and aids in the stirring of the soil so that the beets will be more effectually loosened therein but not removed therefrom. As is best shown in Fig. 5, the outward turning of this lower marginal portion gradually and progressively increases towards the rear end of the runner.

As is shown in Figs. 1 and 3 in which the parts are in their working position, the blades are positioned on their respective beams so as to be somewhat downwardly and forwardly inclined, their broad, flat, inner faces being oppositely disposed on opposite sides of a row of beets. As these blades are drawn through the ground in operative position with respect to a row of beets, the broad, flat, inclined surfaces of the body portions 14 of the blades, which converge toward their lower edges as is shown in Fig. 2, crowd the soil slightly upward between the blades, lifting the beets with the soil. As the main portions of the body faces pass from under the soil so acted upon, such soil will settle back to a considerable extent but the beets that have been loosened and raised are held in their slightly raised position while the soil is settling back by reason of their contact with the rearwardly extending members or runners 18. Inasmuch as the runners 18 have their innermost portions turned to present rounded surfaces to the beets as is above described, the beets will not be cut or damaged by contact with such runners.

By reason of the inclined position of the two opposed blades, as clearly shown in Fig. 2, the upward moving of the soil that lies between them and of a beet in such soil is accomplished, as is well understood. In my improved construction the main or body portion of each blade is wide and flat so that the inner opposed surfaces of such parts will loosen and force up the soil and a beet embedded therein and such body portion terminates abruptly while that member that has been referred to as the runner continues rearwardly from the lower part of the said body. This abrupt ending of the body is of very considerable importance in that the pressure on the soil, while continued long enough to force it and a beet upward as required, is suddenly released and such loosened earth permitted to pass around the ends of the said bodies of the two blades, the runners continuing to support the beet during the time that the soil is settling into position, and also, as hereinbefore stated, aiding in stirring the soil so that the beets will be more loosely retained therein.

By the use of my improved blades, I am enabled to avoid the application of such a force upon the beets as to seriously tear or bruise them and as to crowd them upward to such an extent that they are left lying on top of the ground where they are likely to be injuriously affected by the elements. As is evident from the foregoing description of the construction and operation of my improved blades, my devices act to loosen the soil about the beets and to raise the beets slightly without crowding them out of the earth but leaving them in condition that they can be removed by hand with ease and rapidity. By reason of being left in the earth, the beets will be protected from deterioration by exposure even though they are not removed for a considerable period of time after they have been acted upon by the blades.

What I claim as my invention and desire to secure by Letters Patent, is—

1. A blade for lifting beets, comprising a body member and a comparatively narrow runner-like member projecting rearwardly from the lower part of said body member, the faces of the two members lying in the same longitudinal plane and the rear marginal portion of the body member rising abruptly from the runner-like member.

2. A blade for lifting beets, comprising a body member having a forwardly and downwardly inclined upper edge to form an earth-penetrating point, said edge being laterally turned to form a rounded surface, and a comparatively narrow runner-like member projecting rearwardly from the lower part of the body member with its face in the same longitudinal plane as the face of the body member and the rear marginal portion of the body member rising abruptly from the runner-like member.

3. A blade for lifting beets, comprising a body member having a forwardly and downwardly inclined upper edge to form an earth-penetrating point, said edge being laterally turned to form a rounded surface, and a comparatively narrow runner-like member projecting rearwardly from the lower part of the body member with its face in the same longitudinal plane as the face of the body member and with its lower marginal portion turned laterally to form a rounded surface and the rear marginal portion of the body member rising abruptly from the runner-like member.

4. A blade for lifting beets, comprising a body member having a forwardly and downwardly inclined upper edge to form an earth-penetrating point, said edge being laterally turned to form a rounded surface, and a comparatively narrow runner-like member projecting rearwardly from the lower part of the body member with its face in the same longitudinal plane as the face of the body member, the lower marginal portions of both the body member and the said runner-like member being turned laterally to form a rounded surface and the rear marginal portion of the body member rising abruptly from the runner-like member.

5. A blade for lifting beets, comprising a body member and a comparatively narrow runner-like member projecting rearwardly from the lower part of said body member, the face of the two members lying in the same longitudinal plane, the lower marginal portion of the runner-like member being turned to present a rounded non-cutting edge to the plants in connection with which the blade is used and the rear marginal portion of the body member rising abruptly from the runner-like member.

6. A blade for lifting beets, comprising a body portion having its upper and lower marginal portions turned laterally to present non-cutting edges to the plants in connection with which the blade is used, and a comparatively narrow runner-like member projecting rearwardly from the lower part of the body member, the lower marginal portion of said last-named member being also turned laterally to form a continuation of the lower turned edge of the body member and the rear marginal portion of the body member rising abruptly from the runner-like member.

7. A blade for lifting beets, comprising a body portion and a comparatively narrow runner-like member projecting rearwardly from the lower part of the body member, the lower marginal portion of said last-named member being turned laterally to present a non-cutting edge to the plants in connection with which the blade is used and the rear marginal portion of the body member rising abruptly from the runner-like member.

8. A blade for lifting beets, comprising a body portion and a comparatively narrow runner-like member projecting rearwardly from the lower part of the body member, the lower marginal portion of said last-named member being turned laterally to present a non-cutting edge to the plants in connection with which the blade is used, the degree of said lateral turning increasing toward the rear end of the said runner-like member.

9. A blade for lifting beets, comprising a body portion and a comparatively narrow runner-like member projecting rearwardly from the lower part of the body member, the lower marginal portion of both the body member and the runner-like member being turned laterally to present a continuous non-cutting edge to the plants in connection with which the blade is used, and the degree of such lateral turning increasing gradually from the front to the rear of the blade as a whole.

10. A blade for lifting beets, comprising a body member and a comparatively narrow runner-like member projecting rearwardly from the lower part of said body member, the lower marginal portion of the said two members being turned laterally to form a rounded surface, the upper marginal portion of the forward part of such body member being downwardly and forwardly inclined and laterally turned, the rear part of such upper marginal portion being in substantially the same plane as the main part of the said body member, and the rear marginal portion of the body member rising abruptly from the runner-like member.

11. A blade for lifting beets, comprising a body member having the forward part of its upper marginal portion forwardly and downwardly inclined to form an earth-penetrating point, such inclined forward part being also turned laterally to form a rounded surface, and the rear part of such upper marginal portion lying in substantially the same plane as the main part of the said body member, and a comparatively narrow runner-like member projecting rearwardly from the lower part of the body member, the lower marginal portion thereof being laterally turned to form a rounded surface and the rear marginal portion of the body member rising abruptly from the runner-like member.

12. A blade for lifting beets comprising a flat plate-like body member and a comparatively narrow runner-like member projecting rearwardly from the lower part of said body member, the forward part of the upper marginal portion of said body member being forwardly and downwardly inclined and laterally turned and the remainder of said marginal portion and also the rear marginal portion of the body being in substantially the same plane as the main part of the body member, and the lower marginal portion of said body and runner members being laterally turned and the rear marginal portion of the body member rising abruptly from the runner-like member.

13. A blade for lifting beets, comprising a body portion and a comparatively narrow runner-like member projecting rearwardly from the lower part of the body member, the lower marginal portion of said last-named member being turned laterally to present a non-cutting edge to the plants in connection with which the blade is used, the degree of said lateral turning increasing toward the rear end of the said runner-like member, and the upper marginal part of the body portion being downwardly and forwardly inclined and laterally turned for a part of its length, and in rear of such inclined and turned portion being in substantially the same plane as the main part of the said body.

14. A blade for lifting beets, comprising a body portion and a comparatively narrow runner-like member projecting rearwardly from the lower part of the body member, the lower marginal portion of both the body member and the runner-like member being turned laterally to present a continuous non-cutting edge to the plants in connection with which the blade is used, the degree of such lateral turning increasing gradually from the front to the rear of the blade as a whole, and the upper marginal part of the body portion being downwardly and forwardly inclined and laterally turned for a part of its length, and in rear of such inclined and turned portion being in substantially the same plane as the main part of the said body.

CHARLES E. WHITE.